Figure 1:
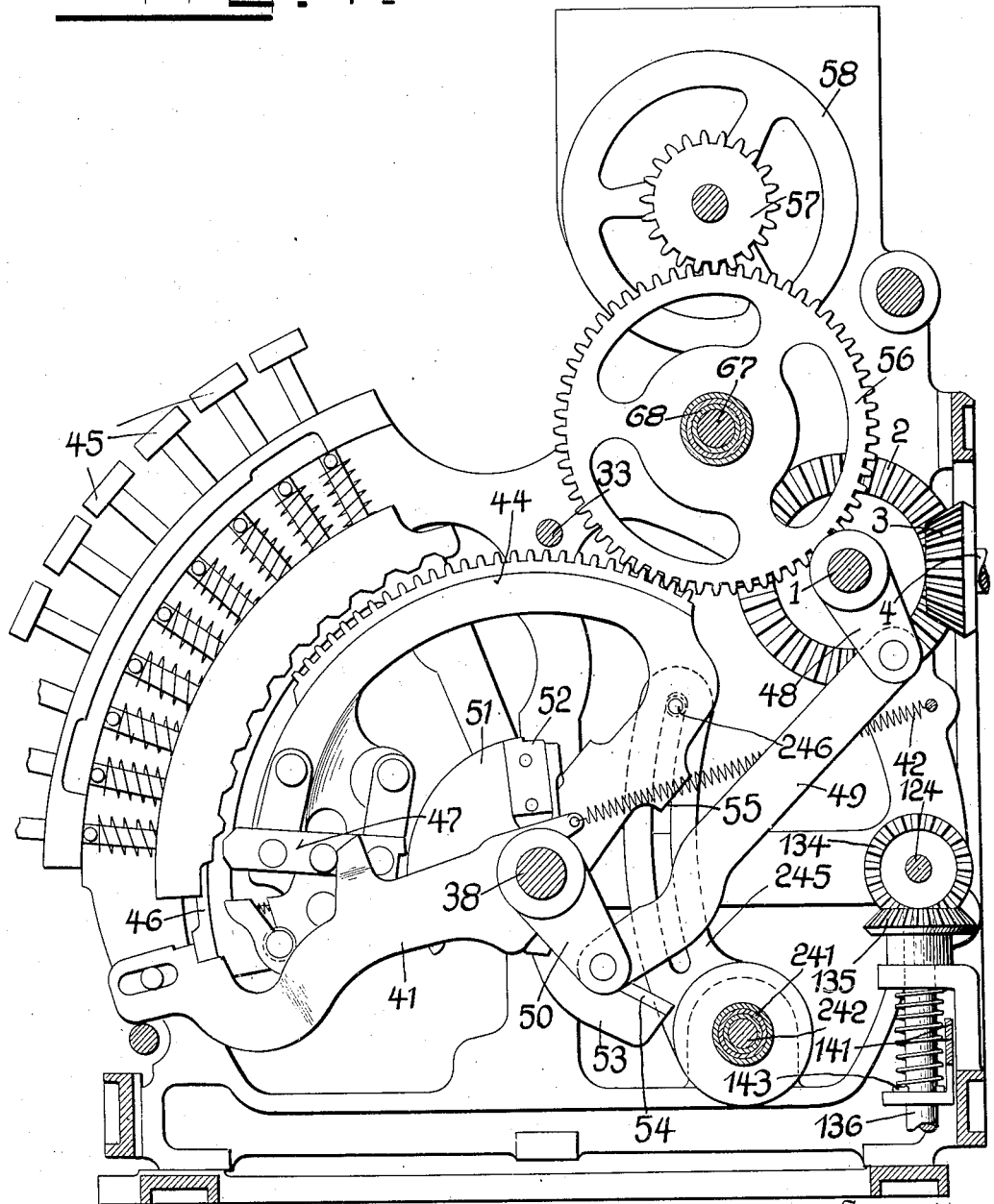

E. J. VON PEIN.
CASH REGISTER.
APPLICATION FILED DEC. 11, 1911.

1,156,258.

Patented Oct. 12, 1915.
9 SHEETS—SHEET 1.

Witnesses
C. Klostermann
R. Rummler

Inventor
Edward J. Von Pein
Attorneys

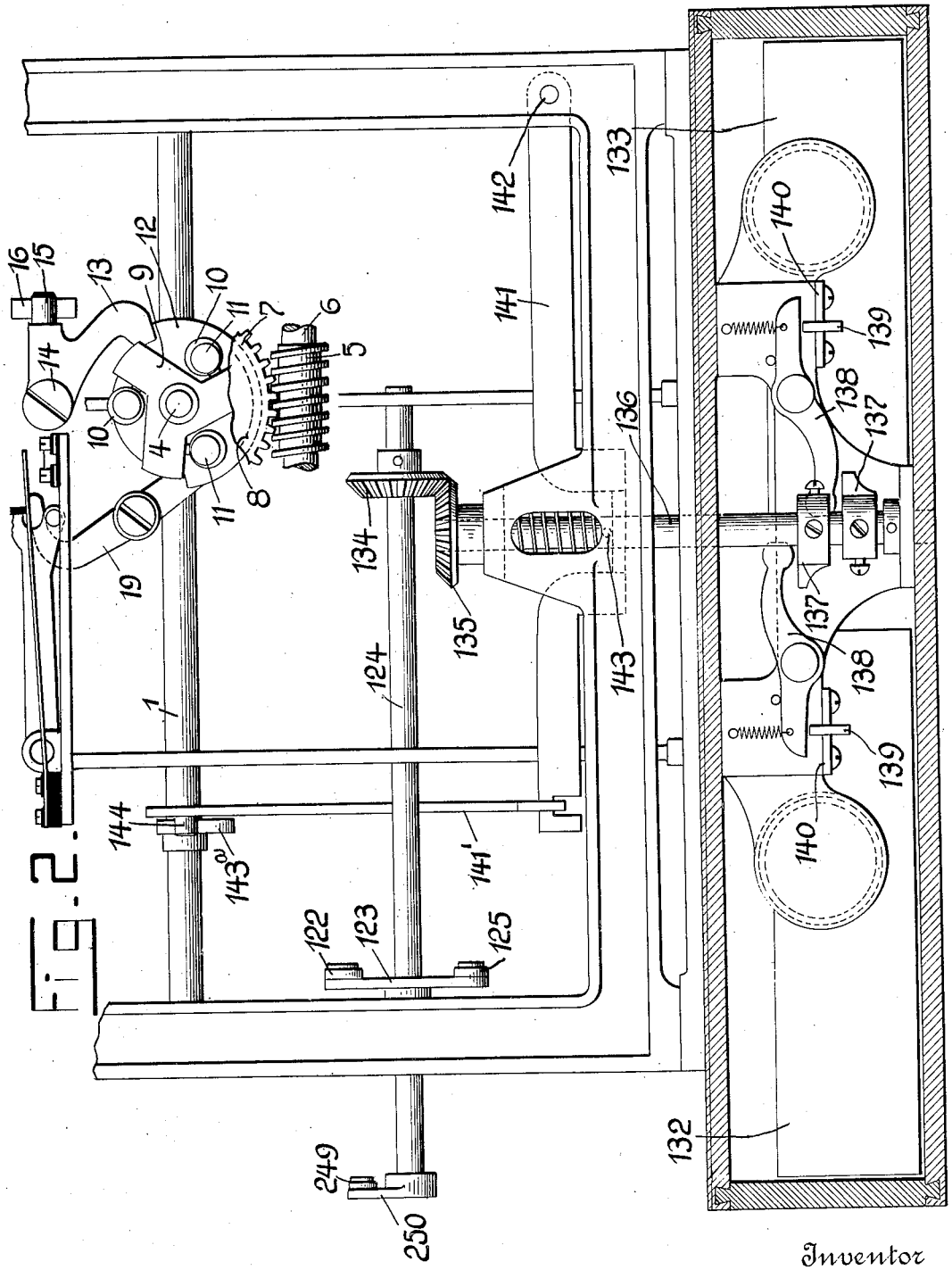

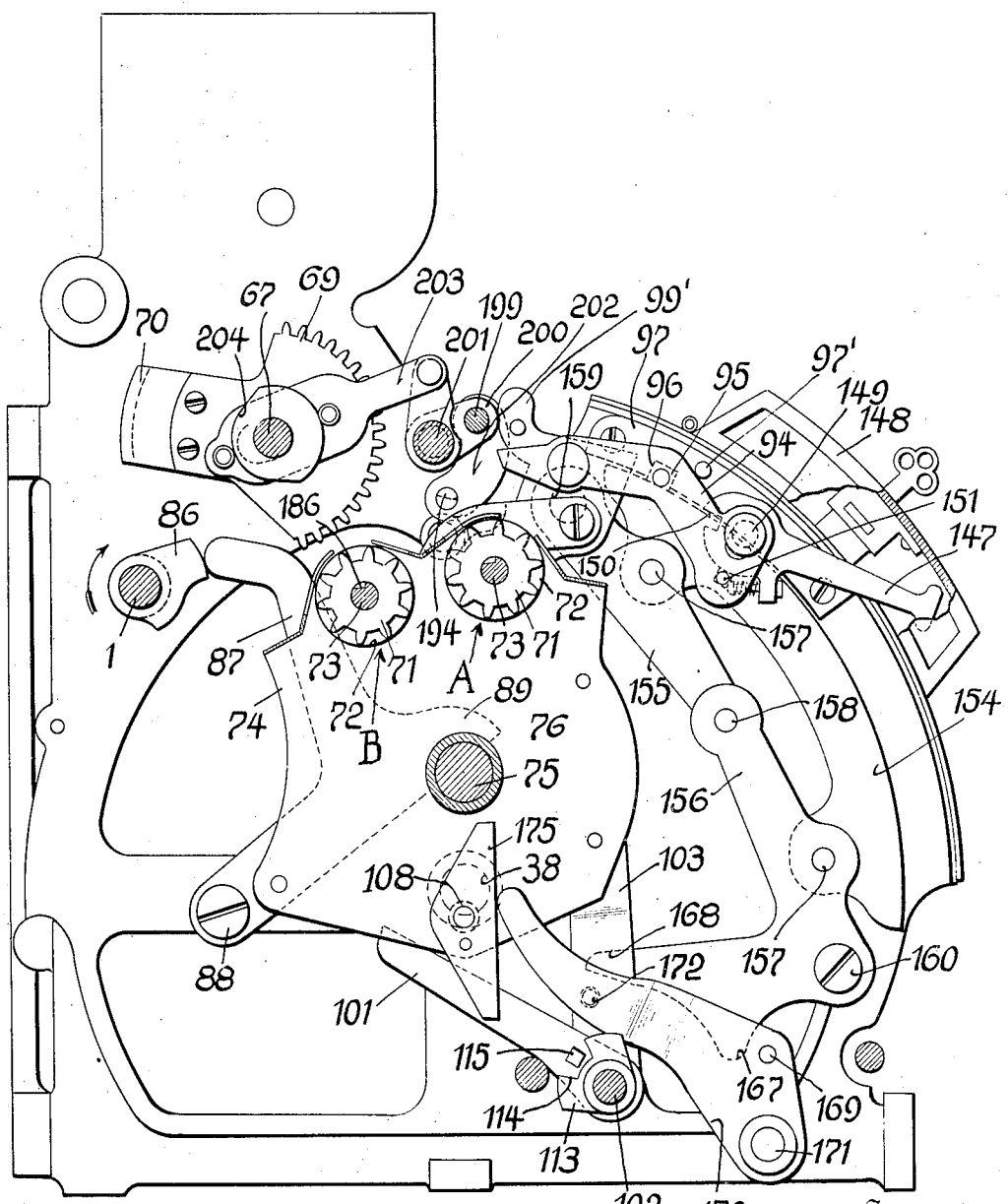

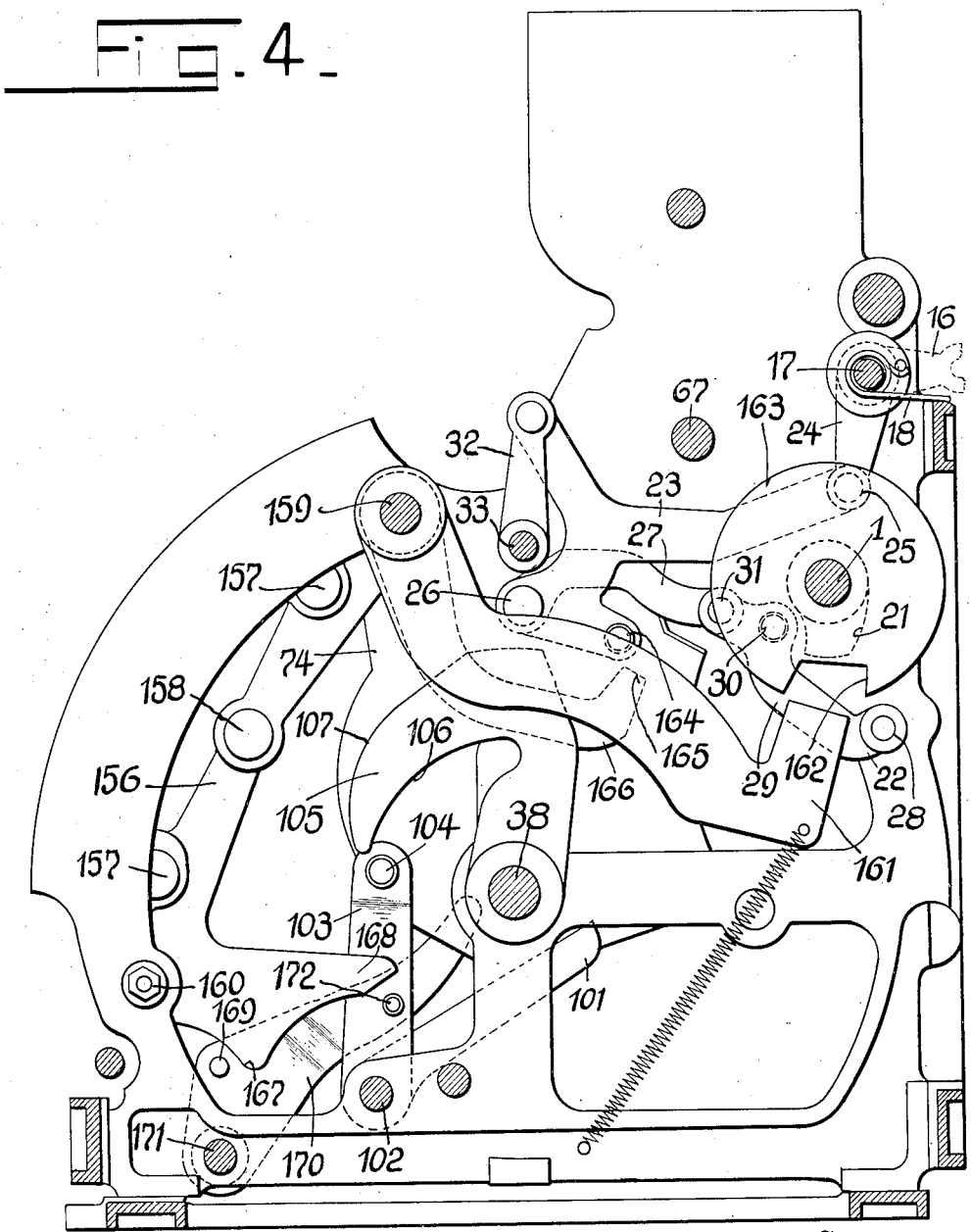

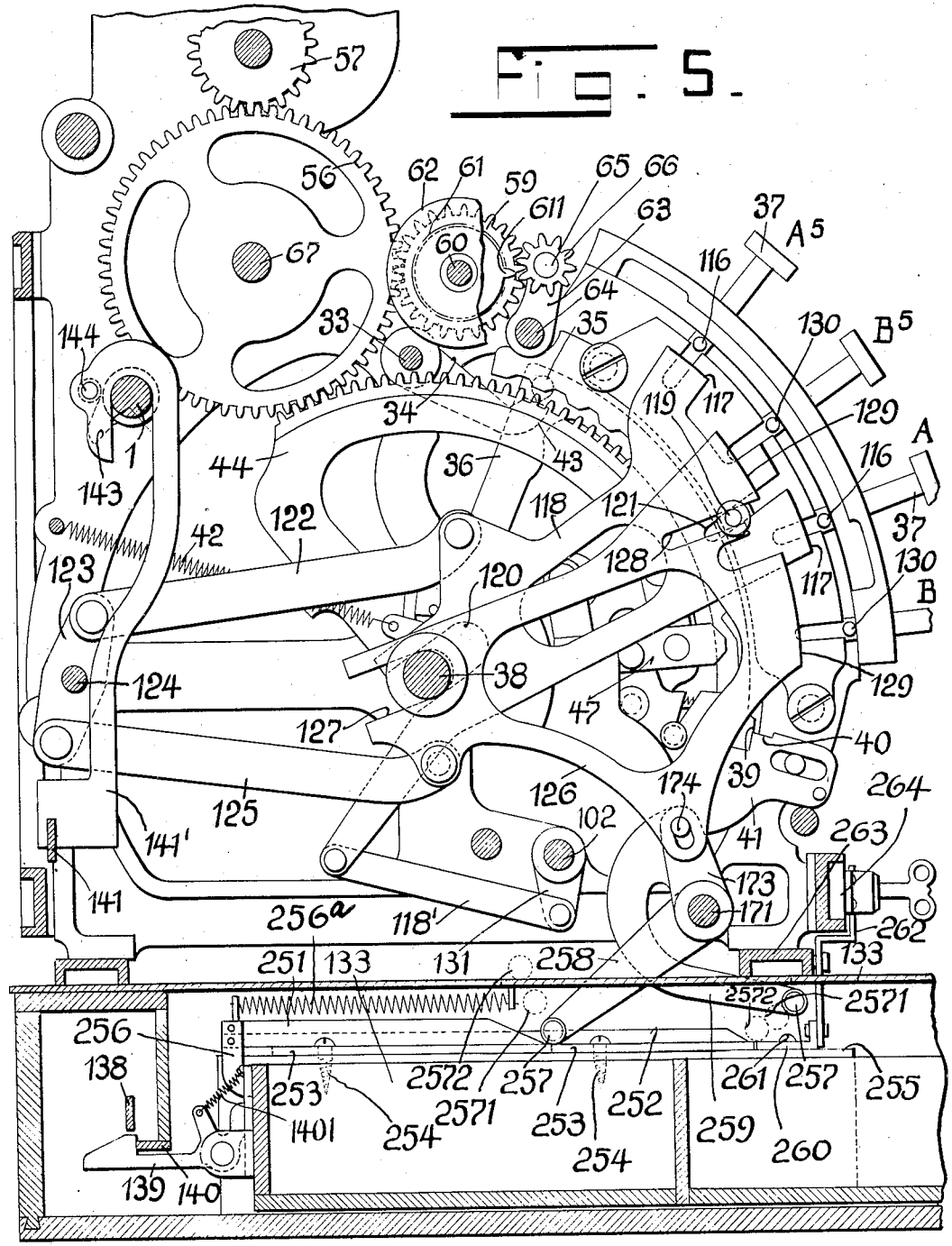

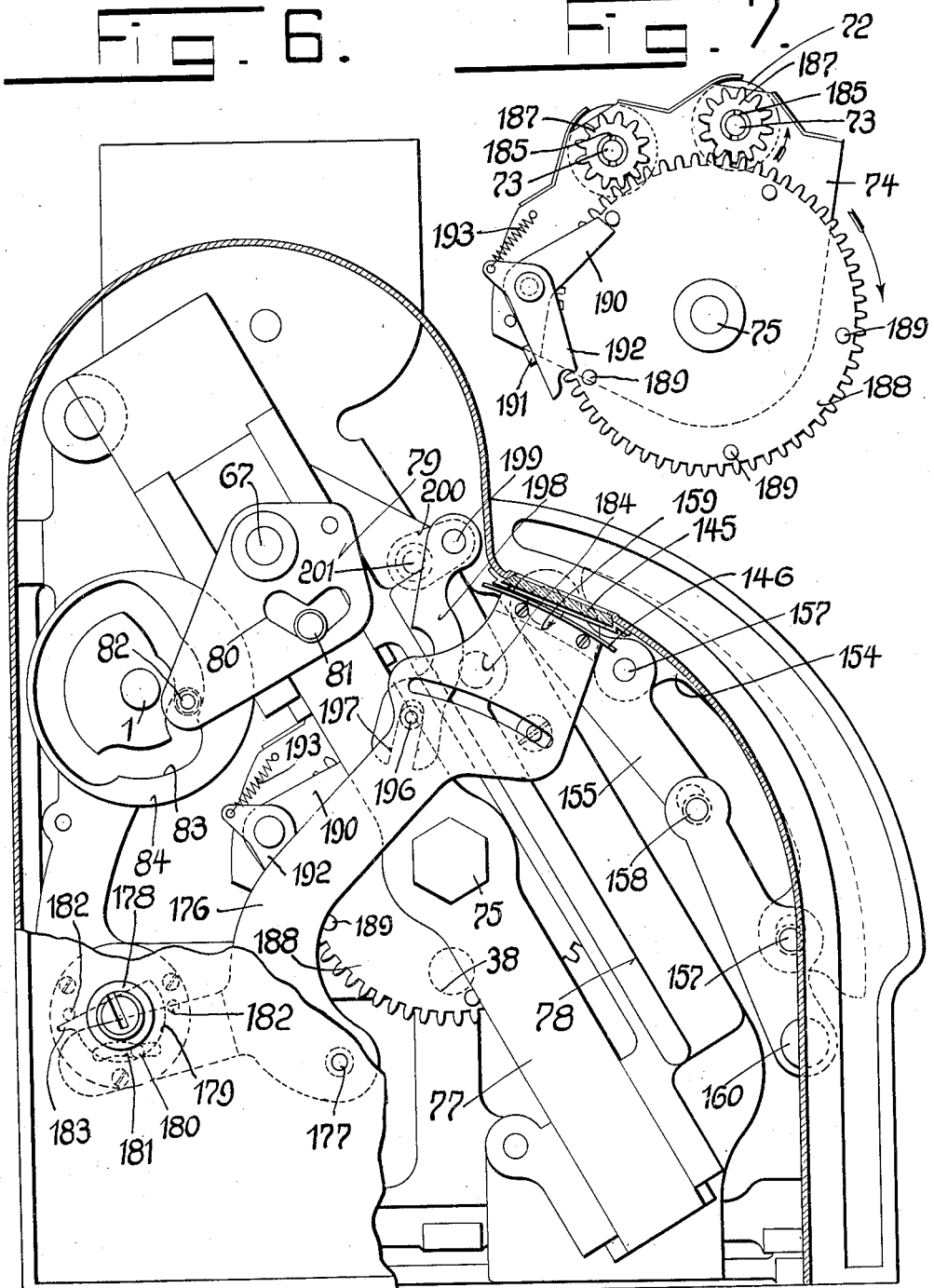

E. J. VON PEIN.
CASH REGISTER.
APPLICATION FILED DEC. 11, 1911.
1,156,258.
Patented Oct. 12, 1915.
9 SHEETS—SHEET 7.
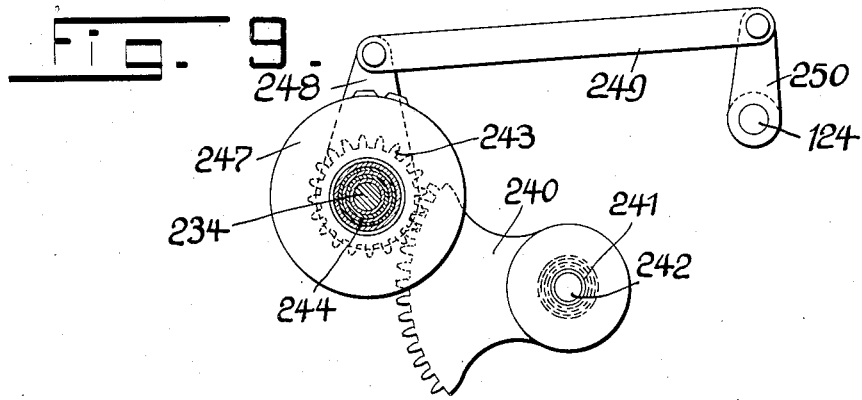
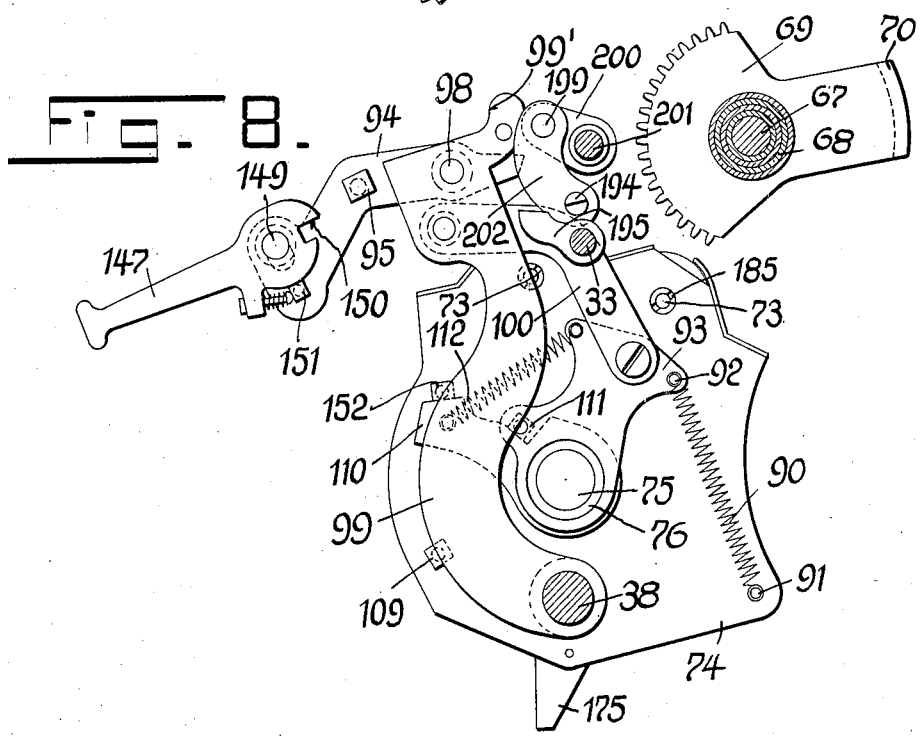
Witnesses
C. Klostermann
R. Rummler
Inventor
Edward J. Von Pein
by
C H Braselton
Attorneys

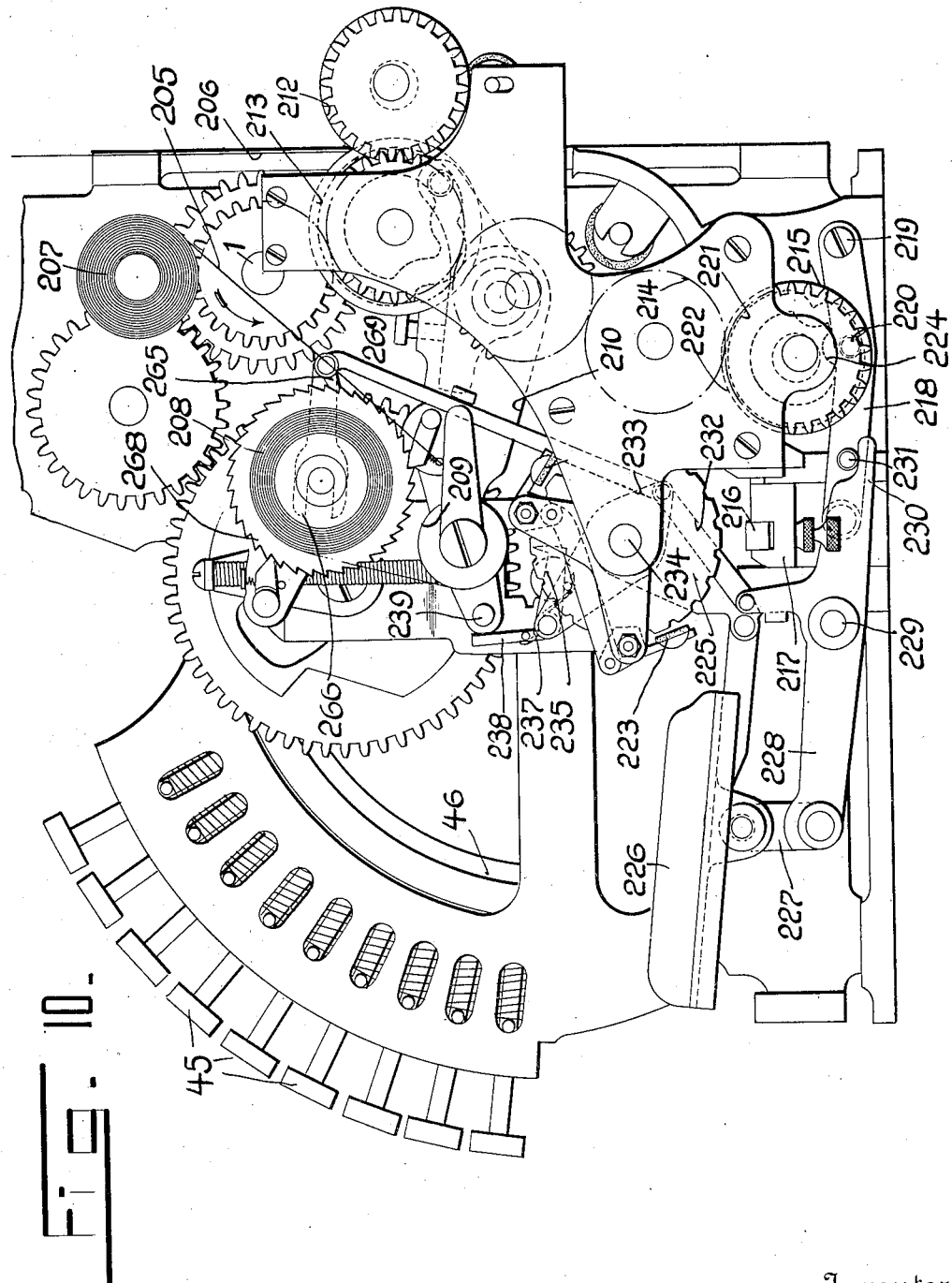

E. J. VON PEIN.
CASH REGISTER.
APPLICATION FILED DEC. 11, 1911.
1,156,258.
Patented Oct. 12, 1915.
9 SHEETS—SHEET 9.
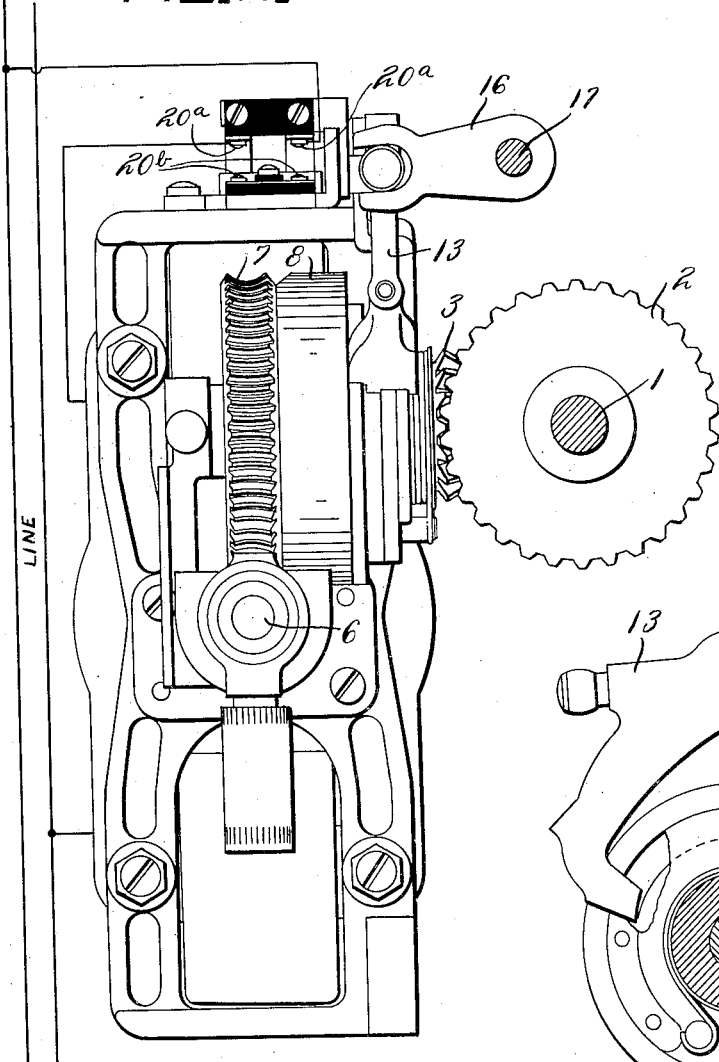
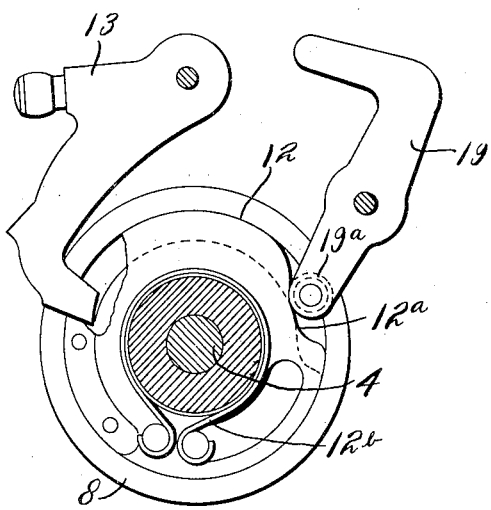
Witnesses
H. F. Sadgebury
J. B. Ricketts
Inventor
Edward J. Von Pein
by Ralston
and Chester H. Braselton
Attorneys

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,156,258.   Specification of Letters Patent.   Patented Oct. 12, 1915.

Application filed December 11, 1911. Serial No. 665,086.

*To all whom it may concern:*

Be it known that I, EDWARD J. VON PEIN, a citizen of the United States, residing at Dayton, in the county of Montgomery and State of Ohio, have invented certain new and useful Improvements in Cash-Registers, of which I declare the following to be a full, clear, and exact description.

This invention relates to cash registers and provides amount determining manipulative devices adapted to control in a novel manner totalizer selecting means in multiple totalizer accounting machines.

The invention involves several incidental improvements such as the selecting means controlling circuit closing devices for driving mechanism; a means for simultaneously resetting a plurality of totalizers; a check printing mechanism not only adapted to automatically issue checks at each operation of the machine, but also having manually operable connections whereby duplicate records or receipts may be printed on inserted slips while the machine is at rest in normal position.

Another object of the invention is to provide a multiple drawer cash register with interlocking devices between the cash drawers and mechanism of the machine which prevents an operation of the machine involving a respective cash drawer when such cash drawer is in its open position, while still permitting an operation of the machine involving the opening of another cash drawer.

Another object of the invention is to provide improvements in sales slip printing mechanism by which as many duplicate slips as desired may be printed and which has connections to feed and make a record on the detail strip for each printing of a sales slip. In the apparatus shown such records on the detail strip are made by perforating the small hole in the strip.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1 is a vertical sectional view of a machine to which the present improvements are applied. Fig. 2 represents a rear elevation of part of Fig. 1 and shows a clutch connecting a main drive shaft with a motor, and also releasing mechanism for two cash drawers. Fig. 3 is a vertical sectional view taken near the left end of the machine showing the multiple totalizers, their carrying frame and operating segments, and controlling devices for the totalizer frame. Fig. 4 is another sectional view showing part of the clutch releasing mechanism, a locking device for such releasing mechanism and a means for locking the machine under control of a totalizer reel positioning lever shown in Figs. 3 and 8. Fig. 5 is a vertical section taken at the side of a bank of initial keys and shows a mechanism controlled thereby for positioning the totalizer reel for controlling the motor clutch and the motor switch, and a drawer interlock. Fig. 6 is a sectional view taken at the extreme left end of the machine and shows mechanism for lifting and lowering the totalizer reel for the purpose of meshing one of the totalizers with the differential mechanism. This view also shows a flash which normally prevents viewing the clerks' totalizers and is also constructed to normally prevent resetting these totalizers, but may under lock and key be rocked out of concealing position, and to a position where it does not obstruct insertion of a resetting key. This view also shows part of mechanism by which the screen prevents operation of the machine when it is in position to permit resetting of the clerks' totalizers. Fig. 7 is a detail of resetting mechanism by which the clerks' totalizers may be simultaneously reset. Fig. 8 is a right side detail elevation of the clerks' totalizer reel showing the construction of the reel and a lever by which the reel may be positioned to permit viewing of the totalizers and also resetting of the totalizers. This view also shows a continuation of the mechanism for preventing operation of the machine shown in Fig. 6. Fig. 9 is a detail of the clerks' initial type carrier and connections by which it is set, and also shows a differential segment meshing with a pinion fast to one of the amount type carriers. Fig. 10 is a view in right side elevation of the machine showing principally printing mechanism adapted to print detail records of transactions and to issue receipts, and a manually operable means by which duplicate receipts may be printed on inserted slips.

Fig. 11 is an end elevation of the motor and clutch connection. Fig. 12 is a detail view of the clutch and coöperating parts shown in Fig. 2 but looking in the reverse direction.

The drawings show a type of machine many features of which appear in the patent to Cleal and Reinhard No. 580,378, April 13, 1897. Other features of the machine appear in the patents to E. J. Von Pein No. 745,937, December 1, 1903, and No. 938,527, November 2, 1909, an application for patent of E. J. Von Pein, Serial No. 498,548, filed May 26, 1909, and in an application for patent of Kettering and Chryst, Serial No. 394,187, filed September 23, 1907. The present specification will rely on these prior patents and applications for detail descriptions of several mechanisms hereinafter referred to.

The cash register to which this invention is here shown as applied, mainly comprises a keyboard controlling mechanism, by which indicators and type wheels are set to represent different amounts, and by which totalizers additively receive these consecutive different amounts. One main totalizer is provided in which all "amount received" records are added. This totalizer has gear connections rockable into and out of mesh with differential mechanism under the control of transaction keys. Two other totalizers mounted on an oscillatory frame are likewise controlled by the transaction keys as to meshing with the differential mechanism, but the meshing occurs by a bodily lifting of the totalizer frame. Its oscillatory movement is for the purpose of bringing one or the other of the totalizers into operative relation with the differential mechanism and is regulated by clerks' initial keys, certain ones of which also serve as amount determining keys.

The present invention relates to the mechanism constituting the selecting means before referred to for rocking the clerks' totalizer frame; and to controlling this mechanism, the differential mechanism, and the motor switch, by clerks' initial keys.

The invention also provides a convenient means for obtaining duplicate records when the machine is at rest after receiving entries.

*Driving mechanism and controlling means therefor.*—The driving mechanism employed in the present invention is in the main like that described in the before mentioned application of Kettering and Chryst; the controlling means for this driving mechanism are, however, different in the present case. In Fig. 1 the main drive shaft 1 is shown provided with a bevel gear 2 meshing with a bevel pinion 3 fast to a countershaft 4. The shaft 4 supports a clutch by which it may be connected to a worm 5 (Fig. 2) fast to the motor armature shaft 6 to be driven thereby. The worm 5 meshes with a worm wheel 7 (Figs. 2 and 11) loosely journaled on shaft 4 but provided with a flange 8 encircling a three arm disk 9 fast to shaft 4. As described in detail in the before mentioned application, a roller 10 is located in each of the pockets formed by the flange 8 and arms of disk 9. These rollers are loose on studs 11 extending from the side of a notched plate 12 loose on shaft 4. A spring 12$^b$, (Fig. 12) normally urges plate 12 to rotate counter clockwise so that rollers 10 will be forced between the flange 8 and the sides of arms 9 which form the least angle with the flange. Then, by permitting the motor to drive the worm wheel 7 in a counter clockwise direction, the rollers 10 become firmly wedged between the flange 8 and arms 9 and consequently drive shaft 4 in a counter clockwise direction.

If disk 12 is held in its normal position the worm wheel 7 may rotate independently of shaft 4, as the rollers 10 are retained in a position where they may freely move away from flange 8 and also not necessarily contact with the arms of disk 9, this free movement being permitted by suitably cutting away the shank of pins 11 so that the rollers are loose thereon. Disk 12 is normally held in a position shown in Fig. 2 by a detent 13 pivoted to the machine frame by a pin 14 and having a stud 15 extending through a jaw of an arm 16 fast to shaft 17 (Fig. 4). Thus to clutch the motor with the driving mechanism it is only necessary to permit shaft 17 to rock counter clockwise under the action of a spring 18. In the present case such rocking of shaft 17 is normally prevented by a detent segment controlled by a bank of initial keys as hereinafter described. Disk 12 has a camming recess 12$^a$, Fig. 12, in which normally rests a roller 19$^a$ carried by arm 19 pivoted to the machine frame. Upon the release of the disk 12 by the withdrawal of the arm 13, a spring 12$^b$ will rotate the disk 12 in a clockwise direction and by the camming recess 12$^a$ rock the arm 19 in a counter-clockwise direction. This rocking of the arm 19 will cause the upper end thereof to bring contacts 20$^a$ and 20$^b$ together thereby closing the motor circuit (Fig. 11), which circuit and connections are shown and described in detail in the aforementioned Kettering and Chryst application. Thus it will be seen that the motor circuit is closed simultaneously with the clutching of the motor shaft with drive shaft 1, but this clutching mechanism permits stoppage of drive shaft 1 by moving arm 13 into position to engage the shoulder on disk 12, while permitting the motor armature to gradually come to rest. When disk 12 is prevented from further rotation, rollers 10 prevent movement of disk 9 and consequently prevent further rotation of shaft 4 and thereby the drive shaft 1.

Arm 13 is rocked back to stopping position when the shaft 1 has made a complete rotation, by a cam 21 fast to shaft 1 (Fig. 4). Cam 21 rocks arm 13 through intermediate mechanism consisting of a toggle 22, a link 23 and an arm 24 fast to shaft 17 and pivoted by a pin 25 to link 23. As spring 18 normally serves to rock shaft 17 counter clockwise it will, through arm 24, urge link 23 to move rearwardly in a horizontal plane thus forcing the pivot 26 connecting link 23 with an arm 27 of the toggle 22, toward the pivot 28 of arm 29 of the toggle. The toggle is shown in this moved position in Fig. 4 and it will thus be clear from the drawing that when main drive shaft 1 completes a rotation in a counter clockwise direction, cam 21 will engage a roller 30 on the toggle near the pivotal connection 31 between the arms of the toggle, and force the pivot 31 toward a plane passing between the pivots 26 and 28. By this means the pivotal connection 26 is forced forward carrying with it link 23, and thereby rocking shaft 17 in a clockwise direction and returning arm 13 in position to be engaged by the shoulder on disk 12. Link 23 is hung at its forward end from an arm 32 fast to a rod 33. Rod 33 carries an arm 34 (Fig. 5) extending below a pin 35 mounted in a key detent 36. The detent 36 is one of a standard form co-acting with each bank of keys, and is described in detail in the Cleal and Reinhard patent before mentioned. The one now under consideration co-acts with a bank of clerks' initial keys 37. The detent 36 is segmental in form and is loosely pivoted on a shaft 38 supported in the machine frames. It is provided with inclined slots which are entered by co-acting lugs on the initial keys when these keys are depressed, and is thereby lifted so that its shoulder 39 rises above a shoulder 40 on a retaining bar 41 which is then drawn rearwardly by a spring 42, thus locking the detent 36 in its upper position and preventing the depressed initial key from returning to normal position. The upward movement of detent 36 carries pin 35 out of the path of the shoulder 43 of arm 34. Rod 33 is then free to rock counter clockwise in Fig. 5 and clockwise in Fig. 4 under the influence of spring 18. By this means the initial keys control the motor circuit and the motor clutch.

*Differential mechanism.*—The differential mechanism is best shown in Fig. 1. It consists of a plurality of segment gears 44 each of which is controlled by a bank of value keys 45, or the bank of initial keys 37. When a key is depressed it lifts the corresponding key detent 46 or 36, thus permitting the retaining bar 41 for such detent, to spring rearwardly. This rearward movement of the retaining bar not only causes it to hold the detent and depressed key in moved positions, but also serves to release and permit movement of the corresponding segment gear 44. The latching devices used in connection with the segments 44 are described in the said Cleal and Reinhard patent, and indicated in these drawings by the numeral 47. These latches are carried by their respective segments 44 and are constructed normally to hold the segments in whatever position they may be left at operations of the machine. When drive shaft 1 is given a rotation it causes an oscillatory movement of shaft 38 by means of its crank and link connection to said shaft indicated by the numerals 48, 49 and 50, the crank 48 being somewhat shorter than the crank 50 its rotation merely causes an oscillatory movement of crank 50. Fast to shaft 38 are a plurality of segment disks 51 provided with shoulders 52 for engaging the latches 47 and through them lifting the segment gears 44 until the latches 47 are disengaged from disks 51 by engagement with the shanks of depressed keys.

The disks 51 have downwardly extending arms 53 provided with flanges 54 for engaging shoulders 55 of segments 44 on the initial movement of segments 51 when arms 53 are moved upwardly. By this means such of the segments as are not in zero position are returned to zero position and then such of the segments as are released by depressed keys, will be rocked upwardly because of engagement of shoulders 52 with latches 47. The extent of upward movement of the segments 44 is determined by depressed keys which serve to unlatch the same from disks 51 at the desired points, the disks 51 continuing their complete movement independently of segments 44. The segments 44 mesh with intermediate gears 56 which in turn mesh with gears 57 fast to the indicator drums 58. Thus the differential movement of the segments is communicated to the indicators. The intermediate gears 56 also mesh with intermediate gears 59 (Fig. 5), loosely journaled on a shaft 60 but fast to a gear 61 of less diameter. The shaft 60 also carries loosely at the side of each gear 61, a pinion of the same size to which is fast a totalizer drum 62. A frame 63 pivoted on a rod 64 carries a rod 65 on which are loosely mounted a number of broad pinions 66, each of which is of sufficient width to simultaneously mesh with a gear 61 and one of said pinions.

Suitable means are provided for rocking frame 63 so that the broad gears will be out of mesh with the gears 61 and the totalizer pinions on the return movement of segments 44, but in mesh with these gears on the forward movement of the segments. By this means the differential movement of segments 44 are additively accumulated in the totalizer pinions, as such movement is communicated in one direction only through the gears 56, 59, 61 and broad pinions 66 to the pinions fast to the totalizer drums.

The preceding description relates to mechanism more fully described in the previously mentioned patents and patent applications. This mechanism in so far as it relates particularly to the bank of initial keys is slightly modified in the present construction. The initial keys control the differential movement of a segment gear 44 in the same manner as the value keys control their respective segments, but the initial keys do not vary in value as the keys of other banks. Only the upper two initial keys represent amounts, and of these each represents five cents. The two lower keys are employed when the amount registered is not five cents, or one ending in five cents. The machine is not designed to register an amount not ending in five cents or a multiple thereof. Consequently the totalizer wheel of lowest denominational order is marked alternately with ciphers and fives and is constructed to carry to the next higher wheel at each second step of its movement.

The particular pinion 61, for driving the totalizer drum of lowest order, instead of having a full set of teeth, has only one, numbered 611, as shown in Fig. 5, and that tooth is so located that the first two units of movement of the segment gear 44 of the initial bank is not sufficient to engage the single tooth with the corresponding broad pinion 66. For this reason depression of one of the lowest two initial keys will not cause rotation of the units totalizer wheel, while depression of either of the upper two keys will cause it to rotate a single unit.

*Multiple totalizers and operating mechanism therefor.*—It may be seen in Fig. 1 that the intermediate gears 56 are fast to a shaft 67 and concentric sleeves 68. As shown in Fig. 8, the shaft 67 and sleeve 68 carry segment gears 69 which are fastened to the shaft and sleeves by integral yokes 70 so that the respective order of intermediates 56 and segments 69 may be maintained. The segment gear 69 of lowest order (not shown) and controlled by the bank of initial keys, has but two teeth for the same reason that pinion 61 of lowest order of the main totalizer has only one tooth, as described above. The clerks' multiple totalizers consist of a plurality of separate totalizers each of which comprises a plurality of pinions 71 (Fig. 3) rigid with totalizer drums 72 all of which are loose on shafts 73 journaled in frames 74 in turn journaled on a stud 75 fixed to slide 77 (Fig. 6). A sleeve 76 connects the frames 74 to permit a wide bearing for the multiple totalizer unit. The totalizer drum of lowest order for each totalizer is numbered alternately with zeros and fives similar to the corresponding drum of the main totalizer.

The particular construction of the transfer mechanism for the totalizers is described in the before mentioned patent to Von Pein No. 938,527. This Von Pein patent also describes mechanism shown in Fig. 6 for bodily lifting and lowering the multiple totalizer frame 74 at the required times for meshing a selected totalizer with the segments 69 so that the differential movement of the segments may be additively accumulated in the clerks' totalizers. This mechanism consists of the slide 77, a suitable guide frame 78 in which the slide 77 is movable, a cam plate 79 loosely journaled on shaft 67 and provided with a slot 80 through which extends a roller 81 on a pin fast to slide 77. Plate 79 carries a roller 82 extending into a groove 83 in a disk 84 fast to drive shaft 1. The shaft 1 rotates in a clockwise direction as it appears in Fig. 6, and the groove in disk 84 is suitably formed to rock plate 79 downwardly after the differential mechanism of the machine has been restored to normal position and consequently when segments 69 are in zero position. The downward movement of plate 79, through its slot 80, lifts slide 77 and thereby causes the selected one of the clerks' totalizers to be meshed with segment gears 69. Then upon the return movement of segment gears 69 the totalizer pinions 71 are rotated in an additive direction extents determined by the particular keys 45 and 37 that are in depressed positions. After the addition is effected a cam 86 (Fig. 3) fast to shaft 1, assists cam 83 in returning the multiple totalizer frame 74 to normal position. Cam 86, toward the latter part of the operation of the machine, engages the end of an arm 87 pivoted to the machine frame by a pin 88 and having a forwardly extending part 89 resting on a collar surrounding shaft 75. Cam 86 is suitably formed to prevent an upward movement of the totalizer frame except at the time when cam 83 comes into action.

The rearmost or B totalizer, as may be seen in Fig. 3, is normally in the proper position to be meshed with the segment 69 when the totalizer frame is lifted. A spring 90 (Fig. 8) normally serves to hold the totalizer frame in this angular position. The spring is extended between a pin 91 of the totalizer frame and a pin 92 on an arm 93, loosely journaled on shaft 75, but normally prevented from rotating around the shaft by a connection to a lever 94 having a square pin 95 seated (Fig. 3) in a recess 96 in a plate 97 secured to the machine frame. Lever 94 is pivoted by a pin 98 to an arm 99 loosely pivoted on shaft 38. The arm 99 is connected by a link 100 with arm 93. Through these connections arm 93 is held immovable so that spring 90 is effective in maintaining a certain angular position of frame 74.

If it is desired to register an amount in the A totalizer, which is normally out of operative relation with segment gears 69, the frame 74 may be rocked against the tension of spring 90 to bring the desired totalizer into operative relation opposite the segments 69. This function is effected by an arm 101 loose on a shaft 102 but integral with or fast to an arm 103 having a roller 104 (Fig. 4) for being engaged by a camming plate 105 fast to the oscillatory shaft 38. As shown in Fig. 4, the roller is in such position that upon operation of the machine the surface 106 of the cam, which is circular to shaft 38, would pass over the roller 104 and thereby not effect the position of arm 103. The arm 103 may, however, be rocked forward so that its roller 104 is in position to be engaged by the eccentric surface 107 of the cam. This may be accomplished by rocking shaft 102 forward by connections controlled by the bank of initial keys 37. When the surface 107 of cam 105 engages the roller 104 the arms 103 and 101 are rocked far enough that arm 101 engages a roller 108 pivoted to frame 74 and thereby causes the frame to rock around shaft 75 bringing the foremost totalizer opposite segment gears 69. This movement of frame 74 is limited by a pin 109 engaging an arm 110 loose on shaft 75, but prevented from rocking in one direction by a pin 111 on arm 93, and in the opposite direction by a spring 112 uniting the arms 110 and 93.

To position roller 104 to one side or the other of cam 105 by means of the initial key, while also permitting independent movement of arms 103 and 101 under the action of cam 105, shaft 102 on which arms 101 and 103 are loosely pivoted carries an arm 113 provided with a slot 114 through which a pin 115 on arm 101 extends. Shaft 102 is oscillated directly by the depression of an initial key either in one direction or the other, or not at all, depending upon its setting as left by a previous operation.

As shown in Fig. 5, there are four initial keys, two of which are marked A and A⁵, the remaining two being marked B and B⁵. Both of the A keys have pins 116 extending across the edges 117 of extensions on a slide 118 slidably mounted on shaft 38 and a fixed pin 119, for which purpose it is provided with the slots 120 and 121. The slide 118 is connected by a link 122 to a lever 123 fast to a rod 124 journaled in the machine frame. To the lower end of a lever 123 is pivoted a link 125 connecting the lever with a slide 126 having slots 127 and 128 through which extend shaft 38 and pin 119. Slide 126 is provided with a pair of extensions having edges 129 over which extend pins 130 on the keys marked B and B⁵. By these connections, if one of the A keys is depressed, slide 118 will move rearwardly and through the link 122, lever 123, and link 125 move the slide 126 forwardly a corresponding distance. Similarly if slide 126 is in its forward position and one of the B keys is depressed, the slide 126 will be moved rearwardly while the slide 118 is moved forwardly. Also, if a slide is in a rear position and one of its respective keys is depressed, neither of the slides will be affected. The slide 118 is connected by a link 118' to an arm 131 fast to the shaft 102. By this means any movement of slides 118 and 126 is communicated to shaft 102, the direction being determined by which of the slides is engaged by one of its respective keys. If in Fig. 5 the slide 118 is moved rearwardly the shaft 102 will be given a clockwise movement in this figure and consequently roller 104 (Fig. 4) will be shifted into position to be engaged by surface 107 of cam 105, then when the drive shaft is permitted to rotate arm 103 will be acted on, causing arm 101 to engage roller 108 (Fig. 3) and thereby rock the foremost totalizer into operative relation with segment 69.

If slide 126 is forced rearwardly to the position shown in Fig. 5, shaft 102 will be rocked in a counter clockwise direction thereby positioning arm 103 and roller 104 as shown in Fig. 4, and consequently the multiple totalizer frame 74 will not be shifted on an operation of the machine, it remaining in the normal position in which it is shown in Fig. 3. The frame 74 assumes this position after each operation of the machine regardless of which of the clerks' totalizers is operated upon, as there is nothing to prevent springs 90 from returning it to this position when cam 105 releases arm 103.

Incidental to the initial keys selecting one or the other of the clerks' totalizers, these keys, by rocking lever 123 (Fig. 5) fast on shaft 124, determine which of the two cash drawers 132 and 133 shall be released when the driving mechanism is permitted to operate, as shaft 124 has connections for setting the drawer selecting mechanism. To this end shaft 124 has rigidly secured thereto a bevel gear 134 (Figs. 1 and 2) meshing with a bevel gear 135 splined to a shaft 136 to cause it to rotate, but to permit the shaft to have an independent longitudinal movement. The shaft 136 and some of its connections for selecting and releasing cash drawers is described in the before mentioned Patent No. 745,937 to Von Pein. Differently set arms 137 are fast to the shaft 136, which may be turned to bring either of arms 137 into suitable position to engage a particular one of arms 138 pivoted to part of the supporting frame and in turn in position to engage drawer latches 139, pivoted to the rear wall of the cash drawers, to disengage the same from fixed plates 140. The respective locations of arms 138 and latches 139 are shown in Fig. 5, the latches being provided with springs 140¹ so that the drawers will become latched in their inner positions when manually returned to such positions. The rocking of shaft 124 determines the angular setting of shaft 136 so that only the desired one of the cash drawers will be permitted to open, and the longitudinal movement of shaft 136, for effecting their release, is effected by an arm 141 pivoted to the machine frame by a pin 142 and extending beneath a pin 143 on shaft 136. At its forward end the arm 141 is hooked into a slot in a pitman 141' as shown in Figs. 2 and 5. The pitman is lifted at the required time by a cam 143ᵃ fast to drive shaft 1 and in position to engage a roller 144 on the pitman.

The lever 94 (Figs. 3 and 8), while incidentally serving to hold arm 93 immovable, also forms part of mechanism by which the rearmost one of the clerks' totalizers may be brought into view beneath the glass plate 145 (Fig. 6). The foremost one of the the clerks' totalizers is normally in such position and in order to read it, it is necessary to rock the screen 146 out of covering position. In the case of the remaining totalizer, the screen must, of course, be away from covering position but also frame 74 should be rocked forwardly. To this end a lever 147 is pivoted to lever 94 but is normally inaccessible, and to gain access to the lever 147 it is necessary to unlock a hinged cover 148 shown in Fig. 3. Lever 147 may then be rocked around its pivotal connection 149 with lever 94 until a notch 150 arrives opposite a squared pin 151 extending from the side of lever 94. The pivot pin 149 is fast to lever 147 and extends through a slot in lever 94 so that the lever 147 may be lowered into engagement with pin 151 when it is brought to an upright position. Then by, depressing lever 147, the pin 95 on lever 94 is carried out of notch 96 so that arm 99 may be rocked forwardly around its pivot 38. This is accomplished by the lever or handle 147 and, through the link 100, arms 93, and spring 90, rocks the totalizer frame 74 forwardly until a curved extension 99' of lever 99 engages a fixed pin 97' (Fig. 3). Excessive movement of frame 74 is prevented by spring 112 holding arm 110 in resilient engagement with the pin 152 on the frame 74. The springs 112 and 90 thus serve at all times properly to center the desired totalizer either opposite the segment 69 or the glass plate 145.

When the normal condition of the totalizer mechanism is thus affected, it is desirable to lock the machine against operation, and it is also desirable to prevent such manual shifting of the totalizers except when the machine is in its normal position. For this purpose a curved plate 154 is pivoted to a pair of arms 155 and 156 by pins 157, the arms 155 and 156 are pivoted together by pin 158, arm 155 is fast to a short shaft 159, while arm 156 is pivoted to the machine frame by a pin 160. By this toggle mounting of plate 154 it is only possible for it to move uniformly away from plate 97, which movement occurs when the handle 147 is depressed, thereby, through the pin 95, forcing plate 154 inwardly. Then when handle 147 is drawn forwardly pin 95 assumes a position between plates 154 and 97 preventing the return of plate 154. By this means shaft 159 is first rocked in a counter clockwise direction (Fig. 4) and is then locked in its moved position. This movement causes a locking arm 161 fast to shaft 159 to enter a notch 162 in a circular disk 163 fast to the main drive shaft 1, thus locking the machine against operation. It is impossible to effect this movement while the machine is being operated, as the outer edge of disk 163 then prevents movement of arm 161. It is also impossible to manually rock the clerk's totalizer frame 74 at a moment when the machine is in normal position and an initial key is depressed, as when an initial key is depressed, link 23 (Fig. 4), as previously described, moves rearwardly carrying a roller 164 above the flat end 165 of an arm 166 also fast to shaft 159, thus rocking of shaft 159 is immediately prevented upon the depression of an initial key.

If the handle 147 is moved away from normal position the nose of arm 166 will rock to the rear of roller 164 and consequently prevent the effective depression of an initial key. It is, however, desirable to positively prevent the depression of an initial key when the clerk's totalizer frame is moved to the reading position, because if it were possible to depress the key but at the same time prevent its effective operation, as above described, it would when in its depressed position permit the closing of the motor circuit and clutching of the driving mechanism with the motor by permitting the action of spring 18 as soon as the totalizer frame was returned to normal position, when pin 95 would enter notch 96 (Fig. 3) and thereby permit plate 154 to return to normal position and the arms 161 and 166 out of locking position. If such sudden operation of the machine were permitted it might result in preventing proper meshing of a clerk's totalizer with segments 69, as the frame 74, because of its resilient mounting, might still have more or less vibration at such time.

To prevent the depression of an initial key when the handle or lever 147 is out of normal position, the arm 156 (Fig. 3), which is rocked rearwardly by said handle, is provided with a pair of extensions 167 and 168 in such location that rearward rocking of arm 156 brings these extensions respectively into engagement with a pin 169 on an arm 170 fast to a shaft 171, and a pin 172 on the arm 103. The shaft 171 has rigidly fastened to it an arm 173 (Fig. 5) having a pin 174 extending through a short slot in the slide 126 previously described. Because of this connection and of the particular position of pins 172 and 169 with respect to the arm 156, the slides 118 and 126 are brought to an intermediate position, that is with both slides midway between their outermost and innermost positions by the rearward movement of arm 156. When lever or handle 147 is depressed for the purpose of shifting the totalizer frame to reading position, arm 156 is forced inwardly and consequently engages one of the pins 172 or 169 depending upon which is in its path because of the particular setting of the slides 118 and 126. Such engagement will cause shafts 102 and 171 to rock in the proper direction and a sufficient extent to bring the slides to a middle position. When the slides are locked in this position by arm 156 it is impossible to depress one of the initial keys far enough to lift the detent 36 into latching position and to release arm 34, as pin 35 will still remain above the shoulder 43 of the arm.

The slides 126 and 118 with their connecting links and levers in principle constitute a parallelogram adapted not only to set a clerk's totalizer wheel and select cash drawers for operation, but to prevent an effective depression of an initial key when the machine is not in condition to receive an entry.

The arm 170 under regular operations of the machine when entries are made, is serviceable to set the rearmost or B totalizer to operative position when one of the B keys is depressed. The depression of a B key serves to rock shaft 171 (Fig. 5) in a counter clockwise direction so that arm 170 thereof (Fig. 5) will engage a lug 175 rigidly secured to the totalizer frame 74. This will serve to properly position the B totalizer irrespective of spring 90, consequently failure of the spring 90 to act would not result in a misoperation of the machine, the arms 101 and 170 constituting positively operating means for rocking the totalizer frame in either direction.

When it is desired to read either one of the totalizers it is necessary to rock an arm 176 (Fig. 6) forwardly around its pivot 177 to carry the screen 146 away from the glass plate 145. This may be effected by operating the key-operated lock 178, the bolt of said lock consisting of a disk 179 having a pin 180 extending through a slot 181 in arm 176. The rocking of disk 179 by an inserted key consequently causes arm 176 to be rocked from one position to another, its rocking movement being limited by fixed pins 182 which are in position to be engaged by a projection 183 of disk 179 at the desired limits of its movement.

The arm 176 serves the additional function of preventing resetting of the clerks' totalizers except when it is moved out of its normal position, at which time it serves, by suitable connections, to lock the machine from operation. The clerks' totalizers are reset by inserting a key through an opening 184 in one of the frames of the machine, and then giving the key a complete rotation counter clockwise. The key is suitably formed to engage notches 185 in one or the other of the totalizer shafts 73, and, accordingly, is adapted to rotate one of these shafts. Each of the shafts is provided with a shouldered groove 186, as indicated in Fig. 3, for co-acting with small pawls pivoted to the totalizer pinions to reset the same, this being a well known construction and described in the before mentioned Von Pein patent. Both totalizers are reset simultaneously, as each totalizer shaft carries fixed thereto a pinion 187 (Fig. 7) meshing with a large gear 188 loose on shaft 75. The gear 188 prevents rotation of shafts 73 in the wrong direction, as it is provided with a number of pins 189 in ratchet relation with a spring pressed pawl 190.

Each time the shafts 73 have completed a rotation for the purpose of resetting, one of the pins 189 engages the pawl 190, rocking the pawl out of its path but permitting the pawl to return to normal position when gear 188 comes to the position shown in Fig. 7. The pawl 190 has a laterally extending lug 191 for the purpose of engaging and rocking a spring pressed pawl 192 into the path of a pin 189 when the gears 187 and resetting shafts 73 have made a complete rotation. Thus the pawl 192 serves to stop the gear 188 when the resetting devices reach normal position, thereby apprising the operator that the totalizers have been reset. Pawl 192 is effective only momentarily as required, as it is permitted to assume its normal position by action of its spring 193 when pressure on the resetting key is discontinued.

The arm 176 (Fig. 6) serves to prevent operation of the machine when the opening 184 is exposed for the purpose of resetting, by having connections to rock a shouldered pin 194 (Fig. 8) into the path of an arm 195 fast to shaft 33, consequently the machine cannot be released by the depression of an initial key as shaft 33 is thus prevented from rocking. This connection consists of a pin 196, on levers 176, extending through a slot 197 in an arm 198, fast to a shaft 199, journaled in supporting arms 200, fast to a shaft 201. Fast to shaft 199 is an arm 202 on which is mounted the pin 194. By this means when lever 176 is rocked forwardly arm 198, shaft 199, and the arm 202 are rocked, thus causing pin 194 to come above the shoulder on arm 195 and prevent rocking of shaft 33 under the action of spring 18 (Fig. 4) by the connections previously described and by means of which the motor circuit is closed and the motor clutch made effective.

Shaft 201 in the present case is employed to support shaft 199 as explained, but in addition serves to support a pitman 203 (Fig. 3) co-acting with a cam 204 fast to shaft 67, this mechanism constituting part of transfer mechanism for the clerks' totalizers, as explained in the patent to Von Pein before referred to.

*Drawer controlled machine lock.*—In cash registers it is usually desired to prevent an operation of the register until the cash drawer is returned to its inner position. If in multiple drawer machines such locking mechanism is operative by the opening of any cash drawer while one clerk is making change, a second could not enter an item in the machine and cause the opening of his respective cash drawer. The present invention provides means by which the machine may not be operated in succession involving a particular cash drawer unless such drawer is returned to its inner position between operations, but does permit an operation of the machine and opening of a second cash drawer while another drawer is in its open position. In order to accomplish this object the cash drawer 133 coöperates with a spring drawn slide 251 (Fig. 5) and the cash drawer 132 coöperates with another spring drawn slide 252. Each of these slides is provided with guiding slots 253 through which pass screws 254 in a plate 255 secured to the machine frame. Also each slide at its rear end has a downwardly extending bracket 256 normally in engagement with the rear wall of its respective cash drawer. Consequently when a cash drawer is released as previously described, its respective slide would tend to move forwardly along the supporting plate 255 under the action of its spring 256ª. The forward movement of a slide is but slight as regulated by its slots 253, but is sufficient to cause its upper edge to come beneath one of the rollers 257 on arms 258 and 259 fast to shaft 171. Slide 251 co-acts with roller on arm 258 while the slide 252 co-acts with the roller on arm 259.

As previously described, the depression of a B key causes the adjustment of plates 126 and 118 and shaft 171, to which plate 126 is connected, to assume the positions indicated in Fig. 5. Accordingly roller 257 on arm 259 is above the slide 252 as shown in the drawing, and the roller 257 on arm 258 is in the path of slide 251. From this it follows that slide 252 may move forwardly when the cash drawer 132 for clerk A moves to its open position.

Assuming that the B key is depressed and the machine then operated, it may be seen from Fig. 5 that the opening of clerk B's cash drawer 133 permits slide 251 to engage roller 257 on arm 258 under its spring action. But slide 251 cannot force arm 258 upwardly as the pin 130 on the depressed B key prevents a forward movement of plate 126, but at the completion of the operation of the machine when the depressed clerk key is released, slide 251, by acting on the roller 257 on arm 258, rocks arm 258 upwardly thus rocking shaft 171 to such a position that the rollers 257 come to rest in the positions indicated by dotted lines 257¹. This rocking movement of shaft 171 causes slides 126 and 118 to assume intermediate positions between their extreme outer and inner positions. As the roller on arm 258 is above slide 251 a B key could not be depressed far enough to release the machine but the machine could be released by the depression of an A key. When an A key is depressed, rollers 257 assume the position indicated by the dotted lines 257² consequently the release of clerk A's drawer causes slide 252 under its spring 256 to engage the roller 257 on arm 259 and (upon release of the A key) again rock the arms and slides 118 and 126 to intermediate positions, and as in this case both of the rollers 257 are above their respective plates 251 and 252 a complete depression of either an A key or a B key is prevented while both cash drawers are in their open positions. Thus if clerk A wishes to operate the machine, it is necessary for him to first return his cash drawer 132 to its inner position. Such return movement causes the rear wall of the drawer to engage bracket 256 of slide 252 and return the slide to its normal position, then shaft 171 may be rocked in a clockwise direction as it must be when an A key is depressed. From the fact that slide 251 is still below the roller on arm 258, a B key could not be depressed until the B cash drawer 133 is returned to inner position, thus forcing slide 251 to its normal position and permitting a counter-clockwise rocking of shaft 171, as occurs when a B key is depressed. If the machine is provided with this interlocking mechanism, the depression of an initial key always has some adjusting effect on plates 118 and 126 if not prevented by the cash drawers, but if this mechanism is omitted from the machine successive depressions of like initial keys would not cause a readjustment of plates 126 and 118, as they are left, on completions of operations, in the positions to which they have been adjusted by the depression of one of their respective keys.

The slides 251 and 252 may be permanently retained in their inner positions to make the drawer operated machine locking mechanism ineffective. This is accomplished by sliding a plate 260 transversely along the support 255 to carry slots in the plate out of alinement with slides 251 and 252; accordingly the slides cannot then move forwardly, as it is necessary for such purpose to have the slots in plate 260 registering therewith. The plate 260 is adjusted as guided by screws 261 by a lever 262 pivoted to the plate at its lower end and at its center to the tie bar 263. The lever 262 may be rocked from its pivot to the tie bar by a key controlled lock 264.

*Printing mechanism.*—The printing mechanism is shown principally in Fig. 10, Fig. 9 showing a detail including a type wheel having characters representing the clerks' keys, there being one character for the two A keys and one for the two B keys. The printing mechanism in the main is like that shown and described in the application of E. J. Von Pein, before referred to, and consists in mechanism for impressing detailed records of each transaction on a record strip 205 and a check strip 206.

The detail strip passes from a supply roll 207 to a receiving roll 208 and around a platen 209, which is carried by an oscillatory frame 210 adapted to rock the platen downwardly first to press an ink pad 211 against the type wheels and then after this pad is moved out of its path, to effect the impression by pressing the detail strip on the type.

The check strip passes from a supply roll, not shown, downwardly between impression and electrotype rollers indicated by numerals 212, 213, 214 and 215 and suitably geared to the main drive shaft 1. The impression on the strip of check paper is effected by a platen 216 carried by a reciprocating head 217 having pivotal connections with an arm 218 pivoted to the machine frame at 219 and having a roller 220 extending into a groove 221 in a cam disk 222 rotatably mounted with the impression roller 215. The groove 221 is suitably formed to cause the platen to first rise a sufficient distance to press the ink pad 223 against the type wheels and to rise a second time to effect an impression on the check paper.

The cam groove 221 is suitably cut away at the point 224 to permit independent operation of the platen when the cam is in its normal position with the machine at rest. Such independent impression from the type wheels 225 may be made on inserted slips, placed above the platen 216, by depressing a bar 226 secured to an arm 227 rigidly fastened to a lever 228 pivoted to the machine frame by a pin 229 and having a rear extension 230 in position to engage a pin 231 on the platen carrying arm 218. Thus, by depressing bar 226, the platen is thrown into engagement with the type wheels thereby effecting any desired duplicate records of transactions. The type wheels 225 remain in set position between operations of the machine, as is well known of this type of machine, and as will appear further on.

The duplicate impression mechanism is operatively connected to a detail strip perforating arm 235, whereby this arm is caused to indent or cut the record strip at the side of the preceding detail record to indicate which records are duplicated on inserted slips. The connection consists of a link 232 from lever 228 to a lever 233 loosely pivoted on the type wheels supporting shaft 234, and having pivoted to its upper end the perforating device 235. The latter is bell crank in form and by the spring 237 is held away from the record strip platen 209. When bar 226 is operated, lever 233 rocks in a clockwise direction, thus causing arm 238 of the perforating device to engage stud 239 and be rocked to effect the desired indication of the duplicate record.

By the duplicate impression mechanism any desired number of duplicate sales slips may be printed by repeating operation of bar 226 and inserting the required sales slips. In order that the perforations of the detail strip 205 are sufficient in number to indicate each operation of bar 226, the bar has connections for feeding the detail strip a slight distance at each operation. The feeding device which it controls includes pawl 265 pivoted on an arm 266 pivoted on the supporting stud for the receiving roller 208. The pawl is spring pressed into engagement with ratchet 268 to which the receiving roller is secured, and the supporting arm for the pawl is connected by a link 269 to the pivot which connects link 232 with the lever 233. Consequently on each depression of bar 226 link 269 is drawn downwardly and causes a slight rotation of the receiving roller 208. In order to insure against repeating operations of bar 226 to effect duplicate impressions without correspondingly feeding the detail strip, the teeth on ratchets 268 are cut fine that even a slight upward movement of bar 226 will result in pawl 265 engaging another tooth of the ratchet wheel and consequently feed the detail strip a slight distance on the downward movement of bar 226.

The amount type wheels 225 shown in Fig. 10 are set by segment gears 240 (Fig. 9) fast to sleeves 241 and shaft 242 meshing with pinions 243 fast to sleeves 244 to which the type wheels are also fast. The sleeves 241 and shaft 242 extend into the machine as shown in Fig. 1 where each carries fast a slotted arm 245 at the side of one of the differential segments 44. Each segment has a pin 246 extending through the slot in one of the arms 245, consequently differential movement of the segments is communicated to the type carriers. As these segments are not restored to normal position until the beginning of a new operation of the machine, the type wheels are permitted to remain in set positions between operations.

The amount type wheel 225, which is set by the initial keys $A^5$ and $B^5$, is provided with four 5¢ characters and four ciphers at suitable points to cause either the cipher or five to be printed on both the detail strip 205 and the check strip 206, depending on the particular initial key which is depressed. If either the A key or B key is depressed, ciphers will be printed. If the $A^5$ key or the $B^5$ key is depressed, fives will be printed, these keys, as explained, regulating the differential operation of one of the differential segments 44 in the same manner as the remaining segments are controlled by the remaining value keys, a construction which is thoroughly described in the Cleal and Reinhard patent. The bank of initial keys, in construction, with respect to controlling the differential mechanism is like an ordinary bank of value keys except that certain of the keys are omitted.

The clerk's initial type carrier 247 (Fig. 9), which is here shown constructed to print on the detail strip 205, is provided with one A and one B character and is journaled on shaft 234 together with an arm 248 fast to the type carrier and pivoted to a link 249 connecting arm 248 with an arm 250 fast to shaft 124 (Fig. 2). The angular setting of this shaft is controlled by the initial keys, as previously described, and because of this, connection with the type carrier 247 determines the setting of the latter.

*Operation.*—To enter a transaction it is necessary to depress the required transaction key, not shown here as it is of customary construction in this type of machine, and the value keys including one of the 5¢ initial keys if the amount to be entered is of an amount ending in 5¢. Otherwise either the A key or B key must be depressed in order to carry pin 35 (Fig. 5) to the rear of the shoulder on arm 34. Shaft 33 is then free to rock rearward as driven by spring 18 (Fig. 4) through the link 23 and arm 32. The operation of spring 18 results in a rearward movement of link 23 thereby causing the pivot 26 to slightly approach pivot 28 and by this means move roller 30 into the path of cam 21. Spring 18 also causes arm 16 to rock upwardly, thus forcing stop 13 (Fig. 2) away from disk 12 permitting the disk to rotate the required distance to lock stop 13 in its moved position and also make the clutch effective and close the motor switch through the lever 19. The drive shaft 1 is then driven from the worm 5, through the wheel 7 and the clutch, shaft 4, bevel pinion 3 and the bevel gear 2 fast to the drive shaft. The differential segments 44 are restored by the resultant oscillation of arms 53 fast to a shaft 38 and simultaneously the clerk's totalizer frame 74 is rocked to bring a desired totalized into operative position opposite segments 69 or the totalizer which is in operative relation is permitted to remain there depending upon whether an A or a B key is depressed. These keys by the slides 118 and 126 and their connections to shaft 102 (Fig. 5) serve to position arm 103 (Fig. 4) with its roller 104, at one side or the other of cam 105. Arm 103 and arm 101 (Fig. 3) have some free play on shaft 102 so that if roller 104 is in position to be engaged by surface 107 of cam 105 these arms may be rocked independently of shaft 102 for the purpose of positioning the foremost one of the clerks' totalizers opposite the operating segments 69. Cam 105 is effective for selecting the proper totalizer during restoring movement of shaft 38 when serving to return all of the main differential segments to normal position, but if roller 104 is at the circular edge 106 of the cam, the arms 103 and 101 will be left in normal position and therefore will not disturb the normal setting of the totalizer reel 74. The reel is rocked by engagement of arm 101 with roller 108 on the reel and against the action of spring 90. When the segments 44 are in normal position cam 84 (Fig. 6) becomes effective, lifting the clerks' totalizer reel and thereby meshing one of the clerk's totalizers with segments 69. After this occurs, segments 44 are differentially positioned as driven by disks 51 (Fig. 1) through the latch 47 to extents determined by the keys which serve to rock latch 47 out of engagement at the proper points. The differential movement through the intermediate gears 56, shaft and sleeves 67 and 68, and segments 69 causes a corresponding forward rotation of the selected clerk's totalizer and also through the shaft 242, sleeves 241 (Fig. 1), and segments 240 (Fig. 9) sets the value type carriers 225 (Fig. 10). The initial type wheel 247 (Fig. 9) is set directly by the depression of an initial key at which time shaft 124, having connections to type wheel 247, is rocked through its connections to slides 118 and 126, as shown in Fig. 5. The platens 209 and 216 are operated at the required times by their respective cams, which, through gears as shown in Fig. 10, receive movement from the drive shaft 1. The cash drawer is permitted to be spring driven to its open position by the lifting of shaft 136 (Fig. 2)

through arm 141, pitman 141' and cam 143 on shaft 1. The opening of a particular drawer is determined by the angular setting of shaft 136 through its geared connection with shaft 124 in turn connected to be operated by the depression of initial keys.

At the completion of the operation of the machine, when cam 105 is restored to the position shown in Fig. 4, spring 90 (Fig. 8) restores the totalizer reel 74 to normal position. Also all of depressed keys are released by the restoration of retaining bars 41 (Fig. 1) to their outer positions, thus permitting detents 46 to spring downwardly and release the keys. Disks 51 are properly shaped to thus cam the retaining bars outwardly. This construction is, however, clearly described in the Cleal and Reinhard patent before mentioned and need not be further described here.

In order to print duplicate records of transactions, a slip is inserted between the platen 216 and the type wheels 225 (Fig. 10) and bar 226 is depressed, thus effecting an operation of the platen.

To determine an amount accumulated by one of the clerks' totalizers, it is necessary to operate lock 178 (Fig. 6) to remove the screen 146 from beneath the glass plate 145. If the desired totalizer is not beneath the glass plate, it may be positioned there by operation of handle 147. Access to the latter may be had by unlocking lid 148 (Fig. 3). The totalizer reel cannot thus be shifted without first adjusting and depressing arm 147 and thereby rocking lever 94 downwardly carrying its pin 95 out of notch 96 and forcing plate 154 inwardly and through arm 155, shaft 159, and arm 161 (Fig. 4) locking the machine against operation. The nose of arm 161 at this time enters the cut 162 in disk 163 on the drive shaft. Also arm 166 fast to shaft 159 moves in back of roller 164 on link 23 thereby preventing an operation of spring 18 by the depression of an initial key. As a further safeguard arm 156 (Fig. 3) is caused to engage one or the other of pins 169 or 172 thus shifting the slides 118 and 126 (Fig. 5) to an intermediate position and thereby effectively preventing a complete depression of an initial key.

The totalizer reel is shifted by handle 147 (Fig. 8) through its connection to the reel consisting of lever 94, pivoted arm 99, link 100, arm 93, and spring 90. During this movement arm 110 is idly rocked through engagement with pins 111 and 152. When the lever 147 is restored to normal position, spring 112 restores arm 110.

When the screen carrying arm 176 (Fig. 6) is moved out of normal position, as explained, the clerks' totalizers may be reset, as the opening 184 for the resetting key is exposed. Resetting may occur by rotating either one or the other of the clerks' totalizer shafts depending upon which shaft is in line with the opening 184. It is therefore immaterial whether the totalizer frame is in its normal position or has been moved forwardly by an operation of the handle 147. It is, however, essential to prevent operation of the machine whenever the arm 176 is moved to permit resetting of the clerks' totalizers, regardless of the position of the reel 74. Accordingly the means for preventing an operation of the machine, controlled by lever 176 and consisting of arm 198, shaft 199, an arm 202, its pin 194 (Fig. 8) and the arm 195 fast to shaft 33, is provided as the locking means controlled by lever 147 would, of course, not be effective when reel 74 is permitted to remain in normal position.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In an accounting machine, the combination with a motor, of a motor circuit including a switch, driving mechanism operated by the motor, a plurality of totalizers, mechanism for operatively connecting any one of said totalizers with the driving mechanism, and a key having suitable connections for closing the motor switch, controlling said connecting mechanism, and the driving mechanism.

2. In an accounting machine, the combination with a motor, a motor circuit including a motor switch, differential mechanism driven by the motor, a plurality of totalizers, mechanism for operatively connecting any one of said totalizers with the differential mechanism, and a key having suitable connections for closing the motor switch, controlling said connecting mechanism, and the differential operation of the differential mechanism.

3. In an accounting machine, the combination with totalizer operating mechanism, of a rotatable reel in which is mounted a plurality of totalizers, key controlled positioning mechanism for said reel whereby any desired totalizer may be operatively connected with said operating mechanism, a manually operable lever whereby the totalizer reel may be set to different positions, and means controlled by said lever for preventing operation of said key controlled positioning mechanism when the lever is moved out of normal position.

4. In an accounting machine, the combination with totalizer operating mechanism, of a plurality of totalizers, key controlled positioning mechanism for said totalizers whereby any desired totalizer may be operatively connected with said operating mechanism, a manually operable means whereby the totalizers may be set to different positions, and a locking mechanism controlled by said manually operable means for preventing operation of said key controlled positioning mechanism when said manually operable means is moved out of normal position.

5. In an accounting machine, the combination with totalizer operating mechanism, of a plurality of totalizers mounted on a movable frame, and key controlled mechanism suitably constructed to position said totalizer frame so as to bring the desired totalizer into operative relationship with the totalizer operating mechanism, and for controlling a differential accounting operation of a selected totalizer.

6. In an accounting machine, the combination with driving mechanism, of type carriers connected to be differentially set by the driving mechanism, a platen having connections to be operated by said driving mechanism, a manipulative device also having connections to operate said platen, and means operated by said manipulative device for making a separate independent record of its operation.

7. In an accounting machine, the combination with driving mechanism, of type carriers connected to be differentially set by the driving mechanism, a platen having connections to be operated by said driving mechanism, a manipulative device also having connections to operate said platen, and means for indicating in a distinguishing manner on a record strip when the manipulative device is operated.

8. In an accounting machine, the combination with driving mechanism, of type carriers connected to be differentially set by the driving member, a platen having connections to be operated by said driving mechanism, and a manipulative device also having connections to operate said platen said connections operated by the driving mechanism constructed to prevent the operation of said manipulative device while the driving mechanism is in motion.

9. In an accounting machine, the combination with a plurality of totalizers, of actuators common thereto, and a plurality of keys controlling the establishment of coöperative relation between each totalizer and the actuators, one of said keys also determining the extent of movement imparted to the selected totalizer by the actuators.

10. In an accounting machine, the combination with a movable frame and a plurality of totalizers mounted thereon, of a set of actuators common to said totalizers and a plurality of keys controlling the establishment of coöperative relation between each totalizer and the actuators, one of said keys also determining the extent of movement imparted to the selected totalizer by the actuators.

11. In an accounting machine, a plurality of totalizers mounted on a movable frame, operating means for said totalizers, manipulative means for moving the movable frame to bring either of the totalizers into operative relation with the operating means, a separate manipulative means for moving the movable frame, and a lock to prevent the operation of said last mentioned manipulative means.

12. In an accounting machine, the combination with accounting devices and operating mechanism therefor, devices having connections for selecting the accounting device to be operated and comprising a pair of slides connected together so as to compel their simultaneous opposite movement, and a manipulative device for moving one of the slides in one direction and a second manipulative device for moving the remaining slide in the same direction.

13. In an accounting machine, the combination with a plurality of totalizing devices and supporting shafts therefor adapted to reset the totalizing devices disposed in a circle and parallel to each other, a pinion fast to each shaft, a gear permanently meshing with all of said pinions whereby the resetting of one of the totalizers will effect the resetting of all, and devices automatically arresting the gear when the totalizers are set.

14. In an accounting machine, a plurality of totalizing devices on separate parallel shafts each constructed that when rotated it will reset its respective totalizer, said shafts being permanently geared together so that rotation of any one will cause rotation of all, and devices automatically and positively arresting the totalizer shafts when the totalizing devices are reset.

15. In a cash register, the combination with a plurality of totalizers, of totalizer operating mechanism, a plurality of cash drawers, latches for the cash drawers, and a key connected to select a totalizer for connection with the operating mechanism, to control said operating mechanism, and to cause the releasing of one of the drawer latches.

16. In a cash register, the combination with type carriers and means for differentially setting the same, of a record strip and a check strip, mechanically operated means for taking an impression from the type carriers on both of said strips and severing the printed portion of the check strip, manually operable means for duplicating on an inserted slip the impression taken on the severed check, and means operated by said manually operated impression means for indicating on the record strip when an impression has been taken by the manually operable means.

17. In a cash register, the combination with type carriers and means for differentially setting the same, of two record strips and mechanically operated means for taking impressions from the type carriers on both record strips, a manually operated means for taking an additional impression from the type carriers, and a perforating device operated by said manually operated means to perforate one of the record strips when the manually operative means is operated.

18. In a machine of the class described, the combination with a series of parallel circularly arranged shafts, totalizers for the respective shafts adapted to be reset to zero by the rotation of their shafts in one direction, a pinion on the end of each shaft, a gear meshing with all of the pinions, means normally tending to prevent movement of the gear in one direction and permit it in the other but adapted at the end of the resetting movement to reverse the directions of permitted and prevented movement until the operating pressure on the gear is removed when normal condition is automatically restored.

19. In a machine of the class described, the combination with a plurality of totalizers, differential mechanism therefor, keys for controlling the movement of the differential mechanism, a set for each totalizer, and connections whereby the depression of a key, besides controlling the movement of the differential mechanism, selects the totalizer to be actuated.

20. In a machine of the class described, the combination with a plurality of totalizers and cash drawers, of differential mechanism, printing mechanism positioned thereby, value keys for the differential mechanism, a set for each totalizer, and connections whereby the depression of a key controls the movement of the differential mechanism, connects the proper totalizer therewith, releases the corresponding cash drawer, and indicates the operator by the printing mechanism.

21. In a machine of the class described, the combination with a plurality of totalizers, a differentially movable actuator therefor, a plurality of sets of value keys for the actuator arranged in a single row, one set for each totalizer, and connections whereby the depression of a key determines the differential movement of the actuator, and the totalizer to be actuated thereby.

22. In a machine of the class described, the combination with registering or recording mechanism, of operating mechanism therefor, a plurality of cash drawers, corresponding manipulative devices through which any desired cash drawer may be permitted to open and having connections to control said operating mechanism, and locking mechanism controlled by the cash drawers which prevents an effective operation of the manipulative devices as regards the operating mechanism and the cash drawer which is in open position but permits an effective operation of the manipulative devices as regards the operating mechanism and cash drawers which are in closed positions.

23. In a machine of the class described, the combination with registering or recording mechanism, of operating mechanism, a plurality of cash drawers, manipulative devices for controlling the operating mechanism and selecting cash drawers for operations and each cash drawer having connections which prevent an operation of its corresponding manipulative device only when the cash drawer is in its open position.

24. In a machine of the class described, the combination with registering and recording mechanism, of operating mechanism therefor, manipulative devices controlling said operating mechanism, machine locking mechanism also controlled by said manipulative devices, a plurality of cash drawers connected to be selected for operation by said manipulative devices, slidable members cooperating with said cash drawers having connections to prevent an effective operation of desired ones of said manipulative devices when their respective cash drawers are in open position.

25. In a machine of the class described, the combination with type carriers and means for differentially setting the same, of a record strip, mechanically operated means for taking an impression on the record strip from the type carriers, manually operable means for duplicating impressions on separate record material, and means operated by said manually operable means for recording on the record strip an indication of each impression taken by said manually operable means.

26. In a machine of the class described, the combination with type carriers and means for differentially setting the same, of a record strip and mechanically operated means for taking impressions on the record strip from the type carriers, a manually operable means for taking additional impressions from the type carriers on separate record material, a perforating device operated by said manually operable means to perforate the record strip when the manually operable means is operated, and the record strip feeding device operated by said manually operable means.

27. In an accounting machine, the combination with an operating mechanism therefor, of a plurality of normally inaccessible cash receptacles, means for determining the cash receptacle to be rendered accessible upon an operation of the operating mechanism, and means controlled by the accessible cash receptacle for preventing the operation of the operating mechanism under certain conditions while permitting the operation of said mechanism under other conditions.

28. In an accounting machine, the combination with a plurality of normally inaccessible cash receptacles, of manipulative devices controlling the rendering of said receptacles accessible, and means controlled by any of the cash receptacles while accessible for preventing operation of its corresponding manipulative device while permitting the operation of the other manipulative devices controlling the remainder of the cash receptacles.

29. In an accounting machine, the combination with a plurality of totalizers, of means common thereto for entering transactions in any desired totalizer, a plurality of normally inaccessible cash receptacles corresponding in number to the totalizers, means for determining the cash receptacle that is to be rendered accessible and for determining the totalizer in which the transaction is to be entered, and means controlled by any cash receptacle while accessible for preventing the entering of a transaction in its corresponding totalizer while permitting the entering of transactions in the other totalizers.

30. In an accounting machine, the combination with a plurality of totalizers, of means common thereto for entering transactions in any desired totalizer, a plurality of normally inaccessible cash receptacles corresponding in number to the totalizers, manipulative devices for determining the cash receptacle that is to be rendered accessible and for determining the totalizer in which the transaction is to be entered, and means controlled by any of the cash receptacles while accessible for preventing the operation of the manipulative device corresponding thereto while permitting the operation of the other manipulative devices.

31. In an accounting machine, the combination with a motor, of a motor circuit including a switch, driving mechanism to be operated by the motor, devices for connecting the motor to the driving mechanism, differential mechanism to be moved by the driving mechanism, a plurality of totalizers, mechanism for operatively connecting any one of said totalizers to the differential mechanism, and a key arranged to control movements of the aforesaid differential mechanism and having connections for closing the motor switch, connecting the motor to the driving mechanism and controlling the totalizer connecting mechanism.

32. In an accounting machine, the combination with a plurality of totalizers of a common actuating mechanism therefor, means whereby said totalizers may be selectively brought into coöperative relation to the actuators, said means also determining the extent of actuation of the totalizer by the actuating mechanism.

33. In an accounting machine, the combination with an operating mechanism, of a movable frame, a plurality of accounting devices carried by said frame, a common item entering mechanism for said accounting devices, manipulative means and connections for controlling the entry of items in the accounting devices, and separate means controlled by said manipulative means whereby the desired accounting device may be brought into operative relation with the item entering mechanism by operation of the operating mechanism.

34. In an accounting machine, the combination with a plurality of totalizers, of actuators common thereto, actuator operating mechanism comprising a manipulative device for each totalizer, each manipulative device having connections to move its totalizer into engagement with the actuators and also control the movement of the actuators.

35. In an accounting machine, the combination with a plurality of totalizers, of an item entering mechanism common thereto, said mechanism comprising manipulative means operable to select the desired totalizer and effect the entry of an item therein.

36. In an accounting machine, the combination with a plurality of cash drawers, of latches for the cash drawers, latch operating mechanism, a type carrier, devices having connections for determining the drawer to be unlatched and positioning the type carrier, said devices comprising elements coupled together to compel their simultaneous opposite movement, manipulative devices for moving one of the elements in one direction and separate manipulative devices for moving the other element in the same direction.

37. In an accounting machine, the combination with a plurality of cash drawers, of latches for said drawers, a common operating element for the latches, a type carrier bearing characters representing the different drawers, means for positioning the common operating element to release the desired drawer and setting the type carrier accordingly, said means comprising slides connected together to compel their simultaneous movement in different directions, and manipulative means for controlling said slides.

38. In an accounting machine, the combination with a plurality of totalizing devices and supporting shafts therefor adapted to reset the totalizing devices, a movable frame carrying said totalizing devices and their supporting shafts, a pinion fast to each shaft, a gear rotatably mounted on the movable frame and meshing with all of said pinions whereby rotation of one pinion will effect rotation of all the other pinions, and means for arresting said gear when the totalizers are set, said arresting means also preventing rotation of said gear in one direction.

In testimony whereof I affix my signature in the presence of two witnesses.

EDWARD J. VON PEIN.

Witnesses:
Roy C. Glass,
Carl W. Beust.